United States Patent
Lee et al.

(10) Patent No.: US 9,054,761 B2
(45) Date of Patent: Jun. 9, 2015

(54) METHOD AND APPARATUS FOR TRANSMITTING REFERENCE SIGNAL IN MULTIPLE ANTENNA SYSTEM

(75) Inventors: Moon Il Lee, Anyang-si (KR); Jae Hoon Chung, Anyang-si (KR); Hyun Soo Ko, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 418 days.

(21) Appl. No.: 13/055,309

(22) PCT Filed: Jul. 17, 2009

(86) PCT No.: PCT/KR2009/003971
§ 371 (c)(1),
(2), (4) Date: Jan. 21, 2011

(87) PCT Pub. No.: WO2010/011056
PCT Pub. Date: Jan. 28, 2010

(65) Prior Publication Data
US 2011/0134867 A1 Jun. 9, 2011

Related U.S. Application Data

(60) Provisional application No. 61/083,164, filed on Jul. 23, 2008.

(30) Foreign Application Priority Data

Dec. 9, 2008 (KR) .................. 10-2008-0124417

(51) Int. Cl.
*H04B 7/00* (2006.01)
*H04B 7/06* (2006.01)
*H04L 5/00* (2006.01)

(52) U.S. Cl.
CPC ............ *H04B 7/0669* (2013.01); *H04B 7/0671* (2013.01); *H04B 7/068* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2003/0139139 | A1 | 7/2003 | Onggosanusi et al. |
| 2007/0037519 | A1 | 2/2007 | Kim et al. |
| 2007/0223681 | A1 | 9/2007 | Walden et al. |
| 2007/0248113 | A1 | 10/2007 | Ko et al. |

(Continued)

FOREIGN PATENT DOCUMENTS

| | | |
|---|---|---|
| CN | 101064546 | 10/2007 |
| KR | 1020070089562 | 8/2007 |

(Continued)

OTHER PUBLICATIONS

Japan Patent Office Application Serial No. 2011-519982, Office Action dated Nov. 1, 2012, 2 pages.

(Continued)

*Primary Examiner* — John Blanton
(74) *Attorney, Agent, or Firm* — Lee, Hong, Degerman, Kang & Waimey

(57) ABSTRACT

A method and an apparatus for transmitting a reference signal in a multiple antenna system are provided. The method includes transmitting a first reference signal based on a first sequence through a first antenna group, and transmitting a second reference signal based on a second sequence through a second antenna group, wherein the first reference signal and the second reference signal are transmitted through a same radio resource.

9 Claims, 12 Drawing Sheets

(56) References Cited

U.S. PATENT DOCUMENTS

| | | | |
|---|---|---|---|
| 2009/0046702 A1* | 2/2009 | Luo et al. | 370/350 |
| 2009/0303978 A1* | 12/2009 | Pajukoski et al. | 370/345 |
| 2010/0103949 A1* | 4/2010 | Jung et al. | 370/468 |
| 2010/0128648 A1* | 5/2010 | Lee et al. | 370/312 |
| 2010/0172421 A1* | 7/2010 | Okamura et al. | 375/260 |
| 2010/0232284 A1* | 9/2010 | Imamura et al. | 370/210 |

FOREIGN PATENT DOCUMENTS

| | | |
|---|---|---|
| WO | 00-55986 A1 | 9/2000 |
| WO | 03-034642 A2 | 4/2003 |
| WO | 2007/119280 | 10/2007 |
| WO | 2008/041546 | 4/2008 |
| WO | 2008/078357 | 7/2008 |

OTHER PUBLICATIONS

The State Intellectual Property Office of the People's Republic of China Application Serial No. 200980132620.8, Office Action dated Apr. 2, 2013, 4 pages.

Japan Patent Office Application Serial No. 2011-519982, Office Action dated Jul. 3, 2013, 2 pages.

* cited by examiner

[Fig. 20]
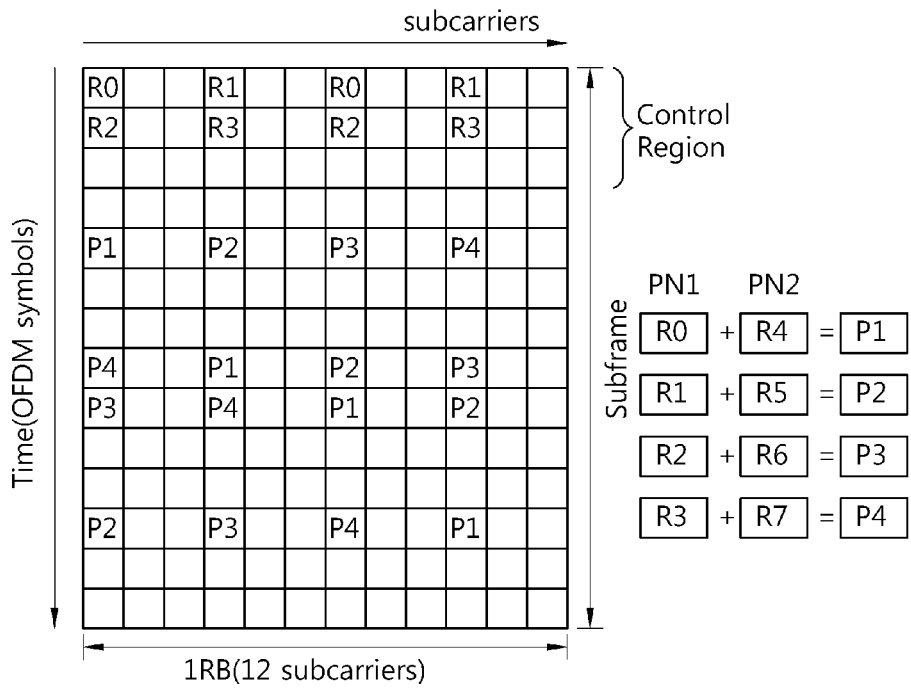
Fig. 21
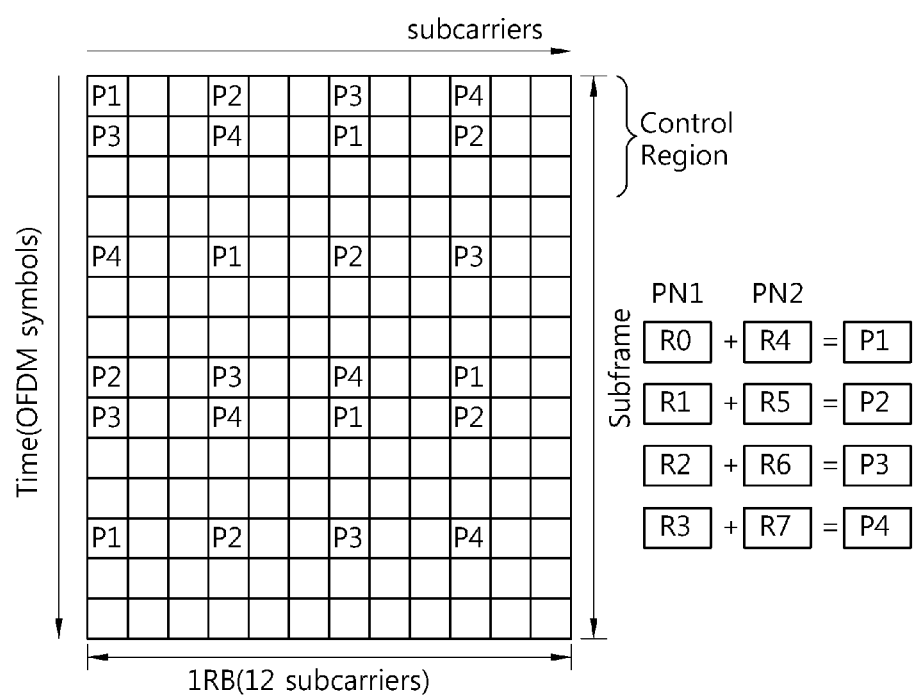

METHOD AND APPARATUS FOR TRANSMITTING REFERENCE SIGNAL IN MULTIPLE ANTENNA SYSTEM

CROSS-REFERENCE TO RELATED APPLICATIONS

This application is a 371 U.S. national stage application of International Application No. PCT/KR2009/003971, filed on Jul. 17, 2009, which claims priority to Korean Application No. 10-2008-0124417, filed on Dec. 9, 2008, and U.S. Provisional Application Ser. No. 61/083,164, filed on Jul. 23, 2008, the contents of which are incorporated by reference herein in their entirety.

TECHNICAL FIELD

The present invention relates to wireless communications, and more particularly, to a method and an apparatus for transmitting a reference signal in a multiple antenna system.

BACKGROUND ART

In next generation multimedia mobile communication systems, which have been actively studied in recent years, there is a demand for a system capable of processing and transmitting a variety of information (e.g., video and radio data) in addition to the early-stage voice service. 3rd generation wireless communication is followed by a 4th generation wireless communication which is currently being developed aiming at support of a high-speed data service of 1 gigabits per second (Gbps) in downlink and 500 megabits per second (Mbps) in uplink. Wireless communication systems are designed for the purpose of providing reliable communication to a plurality of users irrespective of users' locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Orthogonal Frequency Division Multiplexing (OFDM), Multiple Input Multiple Output (MIMO), etc., are techniques for supporting reliable high-speed data services.

An OFDM system capable of reducing an inter-symbol interference effect with a low complexity is taken into consideration as one of post-3rd generation wireless communication systems. In the OFDM, a serially input data symbol is converted into N parallel data symbols (where N is a natural number), and is then transmitted by being carried on N separate subcarriers. The subcarriers maintain orthogonality in a frequency dimension. In a mobile communication market, a standard is expected to be changed from a conventional code division multiple access (CDMA) system to an OFDM-based system.

The MIMO technique improves data transmission/reception efficiency by using multiple transmit (Tx) antennas and multiple receive (Rx) antennas. Examples of the MIMO technique include spatial multiplexing, transmit diversity, beamforming, etc. A MIMO channel matrix depending on the number of Rx antennas and the number of Tx antennas can be decomposed into a plurality of independent channels. Each independent channel is referred to as a layer or a stream. The number of layers is referred to as a rank.

For the purpose of data transmission/reception, system synchronization acquisition, channel information feedback, etc., there is a need to estimate an uplink channel or a downlink channel in a wireless communication system. Channel estimation is a process of recovering a Tx signal by compensating for signal distortion in an environment where a rapid change occurs due to fading. In general, channel estimation requires a reference signal known to both a transmitter and a receiver. The reference signal is also referred to as a pilot.

In the OFDM system, reference signals may be allocated by using two methods, i.e., a first method in which the reference signals are allocated to all subcarriers and a second method in which the reference signals are allocated between data subcarriers. The first method uses a signal (e.g., a preamble signal) consisting of only reference signals. The first method has a significantly improved channel estimation performance in comparison with the second method, but has a decreased data transmission rate. Therefore, the second method can be used to increase the data transmission rate. The second method may result in deterioration of the channel estimation performance since density of the reference signals is decreased. Therefore, it is required that the reference signals are properly arranged to minimize the deterioration of the channel estimation performance.

When the transmitter transmits a reference signal p and the receiver receives an Rx signal y, the Rx signal y can be expressed by the following equation.

MathFigure 1

$$y = h \cdot p + n \qquad [\text{Math.1}]$$

Herein, h denotes a channel on which the reference signal is transmitted, and n denotes thermal noise generated in the receiver.

In this case, the reference signal p is known to the receiver. The receiver can estimate the channel by using the reference signal p. The estimated channel h' can be expressed by the following equation.

MathFigure 2

$$h' = y/p = h + n/p = h + n' \qquad [\text{Math.2}]$$

Accuracy of the estimated channel h' is determined according to n'. For the accuracy of the estimated channel h', n' has to converge to zero. Channel estimation may be performed by using a large number of reference signals to minimize an influence of n'. The receiver can compensate for the estimated channel to recover data transmitted by the transmitter.

Since antennas of a multiple antenna system respectively correspond to different channels, each antenna has to be considered in the designing of a reference signal structure. In a multiple antenna system, it is effective to use even power transmission in which each antenna has the same Tx power as much as possible. Even power transmission using multiple antennas can result in decrease in implementation cost and improvement in system performance.

However, when the reference signal structure is designed so that even power transmission is possible in the multiple antenna system, a reference signal overhead may be significantly increased. The reference signal overhead can be defined as a ratio of the number of subcarriers for transmitting the reference signal to the number of all subcarriers. When the reference signal overhead is great, there is a problem in that the number of data subcarriers for transmitting data in practice is decreased. This results in decrease in a data processing load and deterioration in spectrum efficiency. As a result, an overall system performance may deteriorate.

Accordingly, there is a need for a method and an apparatus for effectively transmitting a reference signal in a multiple antenna system.

DISCLOSURE OF INVENTION

Technical Problem

The present invention provides a method and an apparatus for transmitting a reference signal in a multiple antenna system.

Technical Solution

In an aspect, a method for transmitting a reference signal in a multiple antenna system is provided. The method includes transmitting a first reference signal based on a first sequence through a first antenna group and transmitting a second reference signal based on a second sequence through a second antenna group, wherein the first reference signal and the second reference signal are transmitted through a same radio resource.

Preferably, the radio resource comprises an orthogonal frequency division multiplexing (OFDM) symbol and a subcarrier.

Preferably, the second sequence is obtained by cyclic shifting the first sequence in a time domain.

Preferably, the second sequence is obtained by multiplying the first sequence by a phase shift in a frequency domain.

Preferably, the second sequence is orthogonal to the first sequence.

In another aspect, a method for transmitting a reference signal in a multiple antenna system using M antennas (M≥2, where M is a natural number) is provided. The method includes transmitting a first reference signal based on a first sequence through a first antenna group and transmitting a second reference signal based on a second sequence through a second antenna group, wherein the M antennas are paired into two antenna groups, the first antenna group is one antenna group of the two paired antenna groups, and the second antenna group is the other antenna group of the two paired antenna groups, and wherein the first reference signal and the second reference signal are transmitted through a same radio resource.

Preferably, a resource block is defined per each of the M antennas, the resource block comprises a plurality of OFDM symbols and a plurality of subcarriers, each element of the resource block is a resource element, and the radio resource is a resource element at a specific position in the resource block.

Preferably, the first reference signal and the second reference signal are transmitted through the same number of radio resources in one OFDM symbol within the resource block for each of the M antennas.

In still another aspect, a transmitter is provided. The transmitter includes a first antenna group, a second antenna group and a reference signal generator generating a first reference signal based on a first sequence to be transmitted through the first antenna group, and generating a second reference signal based on a second sequence to be transmitted through the second antenna group, wherein the first reference signal and the second reference signal are transmitted through a same radio resource.

In still another aspect, a receiver is provided. The receiver includes a radio frequency (RF) unit transmitting and/or receiving a radio signal and a processor coupled with the RF unit and configured to receive a first reference signal based on a first sequence and receive a second reference signal based on a second sequence, wherein the first reference signal and the second reference signal are received through a same radio resource.

Preferably, the radio resource comprises an OFDM symbol and a subcarrier.

Preferably, the second sequence is obtained by cyclic shifting the first sequence in a time domain.

Preferably, the first reference signal is a reference signal for a first transmit antenna, and the second reference signal is a reference signal for a second transmit antenna, and the processor configures to estimate a channel of the first transmit antenna in accordance with the first reference signal, and estimate a channel of the second transmit antenna in accordance with the second reference signal.

Advantageous Effects

A method and an apparatus for effectively transmitting a reference signal in a multiple antenna system are provided.

BRIEF DESCRIPTION OF DRAWINGS

FIG. 20 shows a third example of a reference signal structure using CDM.

FIG. 21 shows a fourth example of a reference signal structure using CDM.

MODE FOR THE INVENTION

Figure 1:
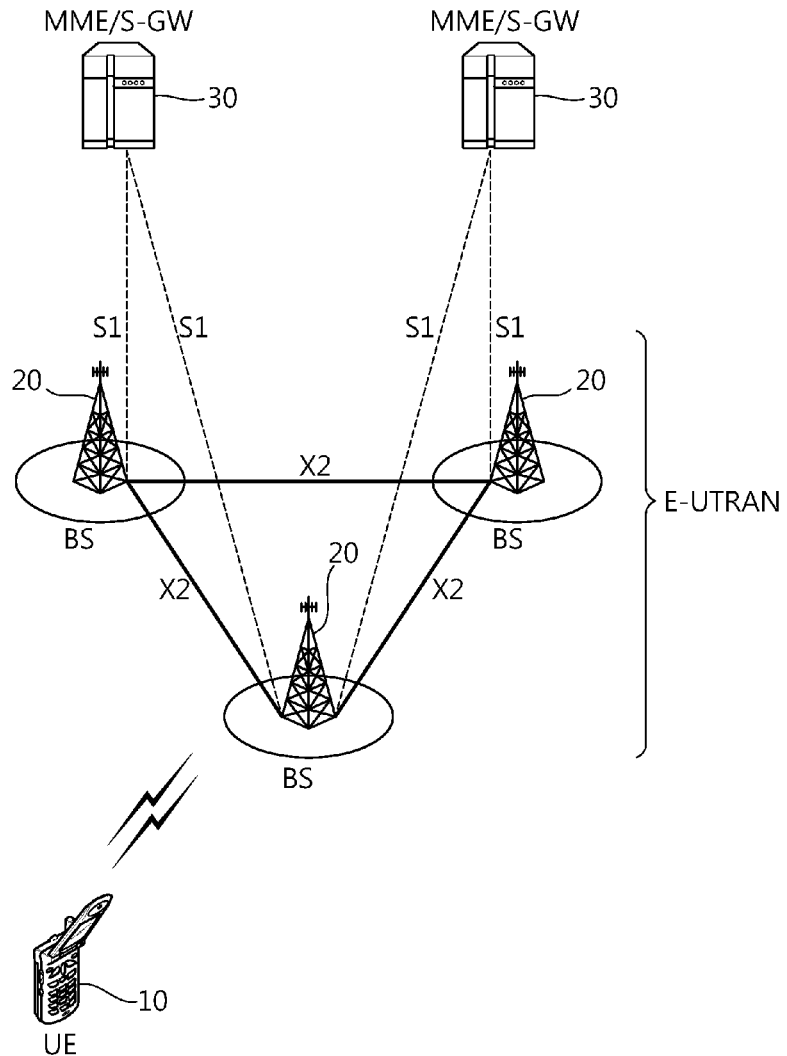
FIG. 1 is a block diagram showing a wireless communication system.

FIG. 1 is a block diagram showing a wireless communication system. This may be a network structure of a 3rd generation partnership project (3GPP) long term evolution (LTE)/ LTE-advanced (LTE-A). The LTE may be also referred to as an evolved-universal mobile telecommunications system (E-UMTS). The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 providing a user plane and a control plane towards a user equipment (UE) 10.

The UE 10 may be fixed or mobile, and may be referred to as another terminology, such as a mobile station (MS), a user terminal (UT), a subscriber station (SS), a mobile terminal (MT), a wireless device, etc. The BS 20 may be a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. The BSs 20 are interconnected with each other by means of an X2 interface. The BSs 20 are also connected by means of an S1 interface to an evolved packet core (EPC), more specifically, to the mobility management entity (MME) by means of the S1-MME and to the serving gateway (S-GW) 30 by means of the S1-U. The S1 interface supports a many-to-many relation between the BS 20 and the MME/S-GW 30.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

The UE belongs to one cell. The cell to which the UE belongs is referred to as a serving cell. The BS which provides the serving cell with a communication service is referred to as a serving BS. The wireless communication system is a cellular system in which another cell is adjacent to the serving cell. The adjacent another cell is referred to as a neighbor cell.

Layers of a radio interface protocol between the UE and the network can be classified into a first layer (L1), a second layer (L2), and a third layer (L3) based on the lower three layers of the open system interconnection (OSI) model that is well-known in the communication system. The first layer is a physical (PHY) layer. The second layer can be divided into a medium access control (MAC) layer, a radio link control (RLC) layer, and a packet data convergence protocol (PDCP) layer. The third layer is a radio resource control (RRC) layer.

Figure 2:
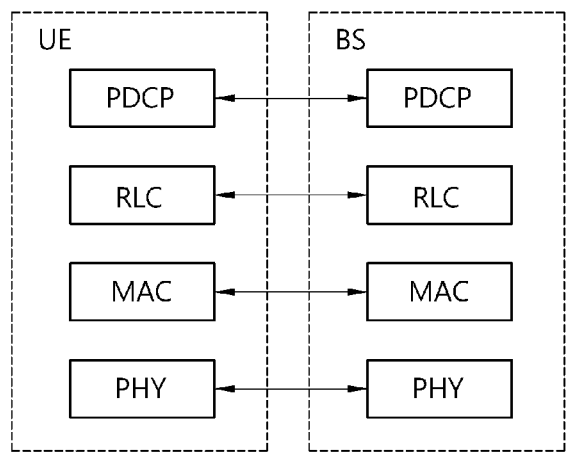
FIG. 2 is a block diagram showing a radio protocol architecture for a user plane.
Figure 3:
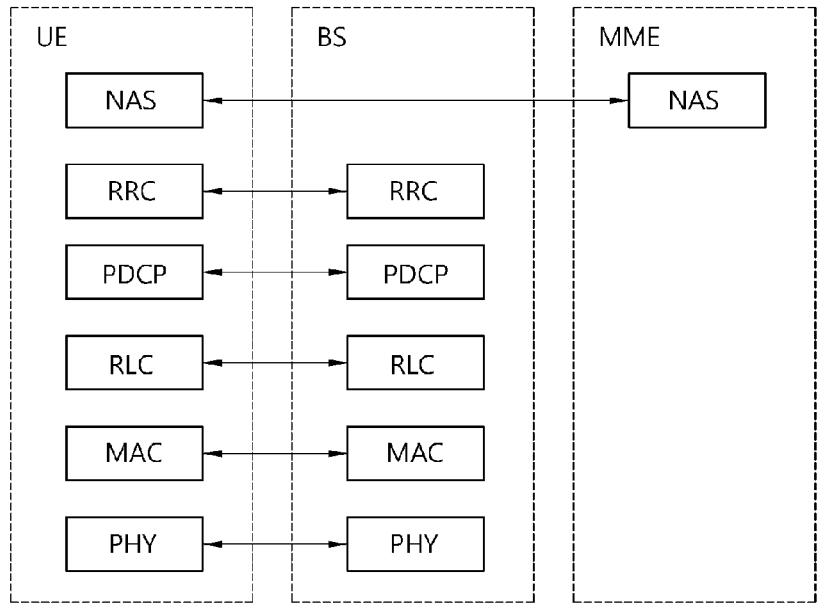
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. They illustrate the architecture of a radio interface protocol between the UE and the E-UTRAN. The user plane is a protocol stack for user data transmission. The control plane is a protocol stack for control signal transmission.

Referring to FIGS. 2 and 3, between different PHY layers (i.e., a PHY layer of a transmitter and a PHY layer of a receiver), information is carried through a physical channel. The PHY layer is coupled with a MAC layer, i.e., an upper layer of the PHY layer, through a transport channel. Data is transferred between the MAC layer and the PHY layer through the transport channel. The PHY layer provides the MAC layer and upper layers with information transfer services through the transport channel.

The MAC layer provides services to an RLC layer, i.e., an upper layer of the MAC layer, through a logical channel. The RLC layer supports reliable data transmission. The PDCP layer performs a header compression function to reduce a header size of an Internet protocol (IP) packet.

An RRC layer is defined only in the control plane. The RRC layer controls radio resources between the UE and the network. For this, in the RRC layer, RRC messages are exchanged between the UE and the network. The RRC layer serves to control the logical channel, the transport channel, and the physical channel in association with configuration, reconfiguration and release of radio bearers (RBs). An RB means a logical path provided by a first layer (i.e. PHY layer) and second layers (i.e. MAC layer, RLC layer and PDCP layer) for data transmission between the UE and the network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 4:
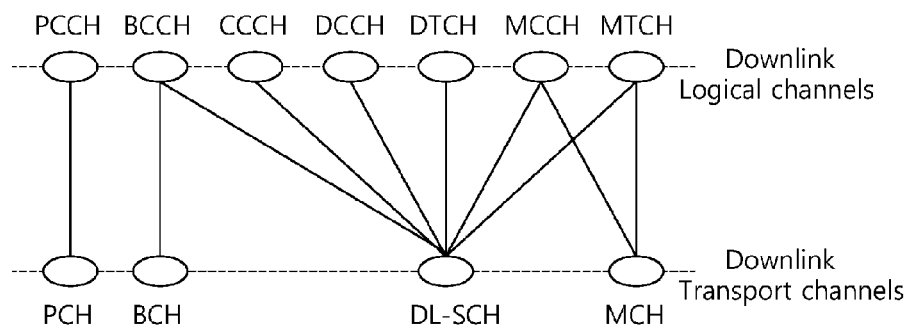
FIG. 4 shows mapping between a downlink logical channel and a downlink transport channel.

FIG. 4 shows mapping between a downlink logical channel and a downlink transport channel. The section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 4, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. The logical channel is classified into a control channel and a traffic channel.

The control channel is used to transmit control plane information. The BCCH is a downlink channel for broadcasting system control information. The PCCH is a downlink channel for transmitting paging information and is used when a network does not know a location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The MCCH is used by UEs that receive an MBMS. The DCCH is a point-to-point bi-directional channel for transmitting dedicated control information between the UE and the network, and is used by UEs having an RRC connection.

The traffic channel is used to transmit user plane information. The DTCH is a point-to-point channel for transmitting user information and exists in both uplink and downlink. The MTCH is a point-to-multipoint downlink channel for transmitting traffic data and is used by UEs that receive an MBMS.

The transport channels are classified by how and with what characteristics data are transferred over the radio interface. The BCH is broadcast in the entire coverage area of the cell and has a fixed, pre-defined transport format. The DL-SCH is characterized by support for hybrid automatic repeat request (HARM), support for dynamic link adaptation by varying modulation, coding, and transmit (Tx) power, possibility to be broadcast in the entire cell, and possibility to use beamforming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

Figure 5:
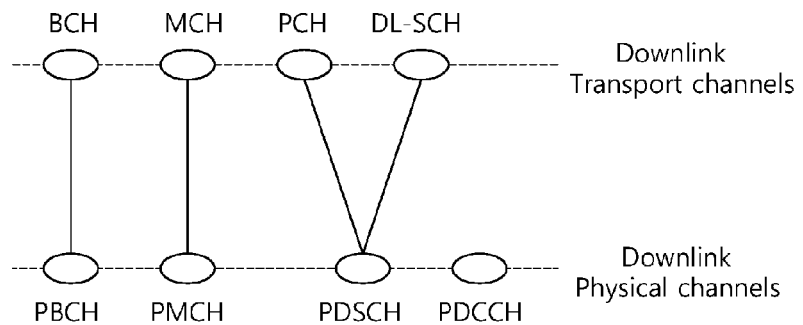
FIG. 5 shows mapping between a downlink transport channel and a downlink physical channel.

FIG. 5 shows mapping between a downlink transport channel and a downlink physical channel. The section 5.3.1 of 3GPP TS 36.300 V8.3.0 (2007-12) may be incorporated herein by reference.

Referring to FIG. 5, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

Several downlink physical control channels are used in a PHY layer. A physical downlink control channel (PDCCH) informs a UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for transmission of the PDCCHs within a subframe. The PCFICH is transmitted in every subframe. A physical hybrid ARQ indicator channel (PHICH) carries HARQ acknowledgement (ACK)/negative-acknowledgement (NACK) in response to uplink transmission.

Figure 6:
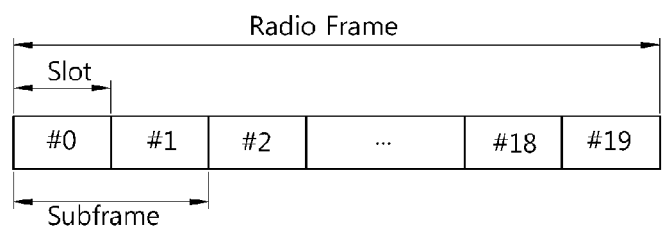
FIG. 6 shows a structure of a radio frame.

FIG. 6 shows a structure of a radio frame.

Referring to FIG. 6, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Figure 7:
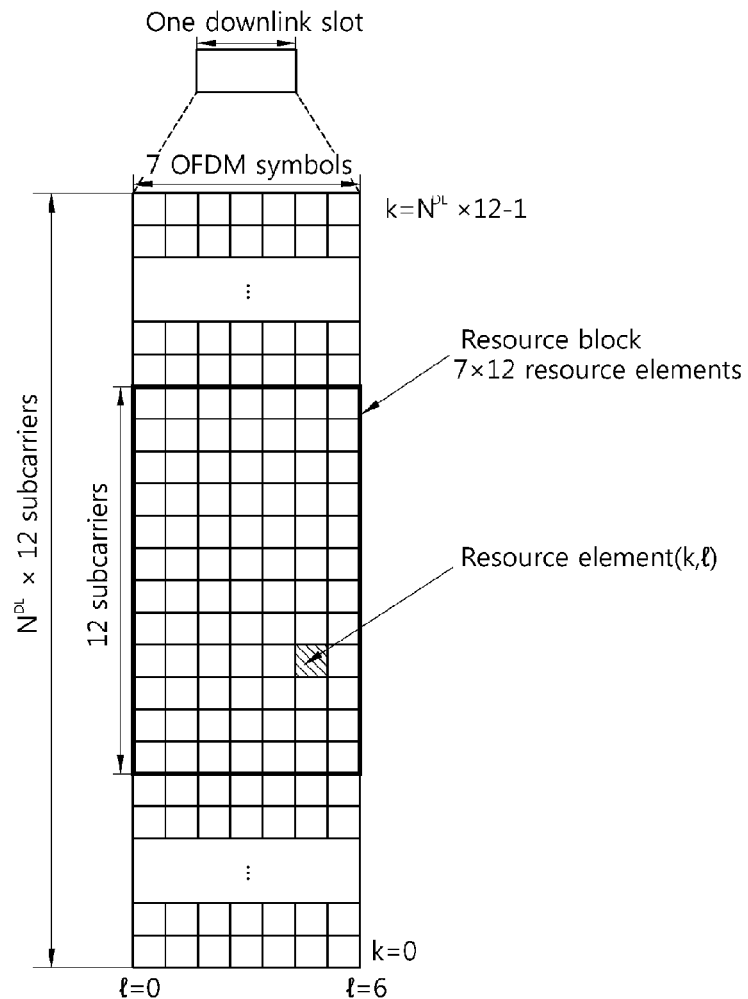
FIG. 7 shows an example of a resource grid for one downlink slot.

FIG. 7 shows an example of a resource grid for one downlink slot.

Referring to FIG. 7, the downlink slot includes a plurality of OFDM symbols in a time domain and $N^{DL}$ resource blocks (RBs) in a frequency domain. The OFDM symbol is for representing one symbol period. The OFDM symbol may also be referred to as an orthogonal frequency division multiple access (OFDMA) symbol, single carrier-frequency division multiple access (SC-FDMA) symbol, etc. in accordance with multiple access scheme. The number $N^{DL}$ of resource blocks included in the downlink slot depends on a downlink transmission bandwidth configured in a cell. For example, in a 3GPP LTE system, $N^{DL}$ may be any one value in the range of 60 to 110. One RB includes a plurality of subcarriers in the frequency domain.

Each element on the resource grid is referred to as a resource element (RE). The resource element on the resource grid can be identified by an index pair (k, l) within the slot. Herein, k (k=0, . . . , $N^{DL} \times 12-1$) denotes a subcarrier index in the frequency domain, and l (l=0, . . . , 6) denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048. The structure of an uplink slot may be same as that of the downlink slot.

Figure 8:
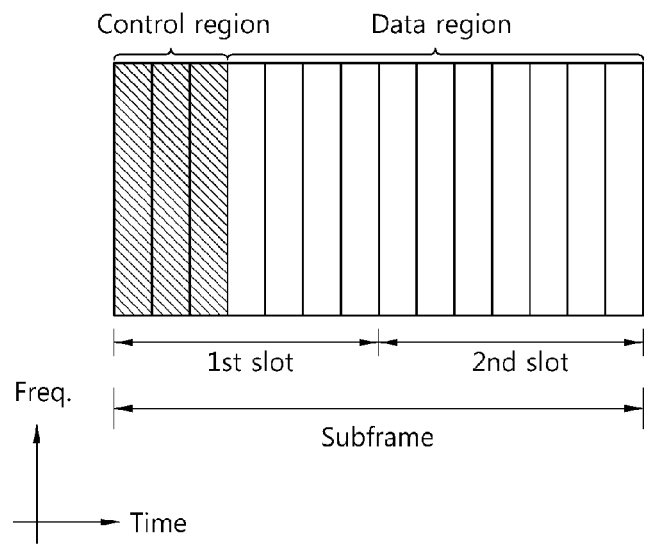
FIG. 8 shows a structure of a subframe.

FIG. 8 shows a structure of a subframe.

Referring to FIG. 8, the subframe includes two consecutive slots. A maximum of three OFDM symbols located in a front portion of a 1st slot within the subframe correspond to a control region. The remaining OFDM symbols correspond to a data region. Control channels such as a PCFICH, a PHICH, a PDCCH etc., can be assigned to the control region. A PDSCH can be assigned to the data region. A UE can read data information transmitted through the PDSCH by decoding control information transmitted through the PDCCH. Although the control region includes three OFDM symbols herein, this is for exemplary purposes only. The number of OFDM symbols included in the control region of the subframe can be known by using the PCFICH.

Figure 9:
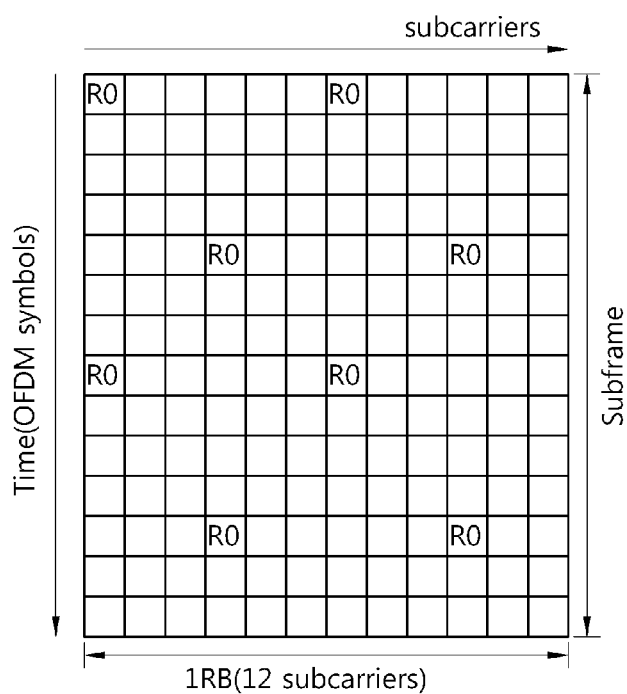
FIG. 9 shows an example of a reference signal structure when a base station uses one antenna.

FIG. 9 shows an example of a reference signal (RS) structure when a BS uses one antenna.

Referring to FIG. 9, R0 denotes a resource element used to transmit a reference signal through an antenna 0. In one OFDM symbol, R0s are located with a spacing of 6 subcarriers. The number of R0s is constant within a resource block.

Hereinafter, a resource element used to transmit a reference signal is referred to as a reference symbol. Resource elements other than the reference symbol can be used for data transmission. A resource element used for data transmission is referred to as a data symbol. One reference signal is transmitted for each antenna. A reference signal for each antenna is transmitted through reference symbols.

When a serving cell and a neighbor cell use the same-structured reference signal, collision may occur between the cells. To avoid the collision, a reference signal can be protected by shifting reference symbols in a frequency domain on a subcarrier basis, or by shifting the reference symbols in a time domain on an OFDM symbol basis.

Figure 10:
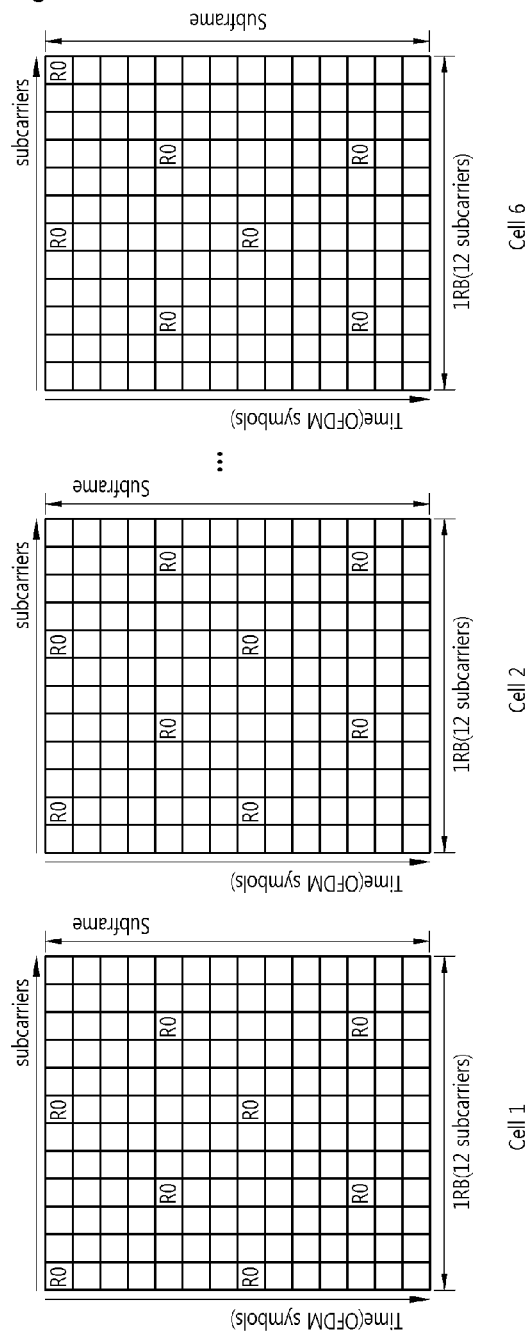
FIG. 10 shows an example of a reference signal structure in which shifting is performed in a frequency domain when a base station uses one antenna.

FIG. 10 shows an example of an RS structure in which shifting is performed in a frequency domain when a BS uses one antenna.

Referring to FIG. 10, a 1st cell uses reference symbols located with a spacing of 6 subcarriers in one OFDM symbol. Thus, by shifting the reference symbols on a subcarrier basis in the frequency domain, at least 5 neighbor cells (2nd to 6th cells) can use reference symbols respectively located in different resource elements.

Accordingly, collision of reference signals is inevitable among the 1st to 6th cells. For example, if vshift denotes a variable indicating the number of subcarriers for shifting reference symbols in the frequency domain, vshift can be expressed by the following equation.

MathFigure 3

$$v_{shift} = N_{cell\_ID} \bmod 6 \quad \text{[Math.3]}$$

Herein, $N_{cell\_ID}$ denotes a cell identifier (ID).

A reference signal may be multiplied by a predetermined reference signal sequence when transmitted. For example, the reference signal sequence may be generated based on a pseudo-random (PN) sequence, an m-sequence, etc. The reference signal sequence may be generated based on a binary sequence or a complex sequence. When the BS transmits the reference signal multiplied by the reference signal sequence, interference of a reference signal received from a neighbor cell can be reduced and thus channel estimation performance can be improved in a UE. The reference signal sequence may be used on an OFDM symbol basis in one subframe. The reference signal sequence may vary according to a cell ID, a slot number in one radio frame, an OFDM symbol index in a slot, a CP length, etc.

Referring to FIG. 9, in an OFDM symbol including reference symbols, the number of reference symbols for each antenna is 2. Since a subframe includes $N^{DL}$ resource blocks in the frequency domain, the number of reference symbols for each antenna is $2 \times N^{DL}$ in one OFDM symbol. Thus, a reference signal sequence has a length of $2 \times N^{DL}$.

When r(m) denotes a reference signal sequence, the following equation shows an example of a complex sequence used as r(m).

MathFigure 4

$$r(m) = \frac{1}{\sqrt{2}}(1 - 2 \cdot c(2m)) + j\frac{1}{\sqrt{2}}(1 - 2 \cdot c(2m+1)) \quad \text{[Math. 4]}$$

Herein, m is 0, 1, ..., $2N^{max,DL}-1$. $N^{max,DL}$ denotes the number of resource blocks corresponding to a maximum bandwidth. For example, in the 3GPP LTE system, $N^{max,DL}$ is 110. c(i) is a PN sequence and can be defined by a Gold sequence having a length of 31. The following equation shows an example of a sequence c(i) having a length of $2 \times N^{max,DL}$.

MathFigure 5

$$C(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \quad \text{[Math.5]}$$

Herein, $N_C$ is 1600, $x_1(i)$ denotes a 1st m-sequence, and $x_2(i)$ denotes a 2nd m-sequence. For example, the 1st m-sequence can be initialized with $x_1(0)=1$, $x_1(n)=0$ (n=1, 2, ..., 30) at the start of each OFDM symbol. The 2nd m-sequence can be initialized according to a cell ID, a slot number in one radio frame, an OFDM symbol index in a slot, a CP length, etc. at the start of each OFDM symbol.

When a system has a bandwidth smaller than $N^{max,DL}$, a certain portion of a reference signal sequence generated to have a length of $2 \times N^{max,DL}$ can be selected to be used.

Figure 11:
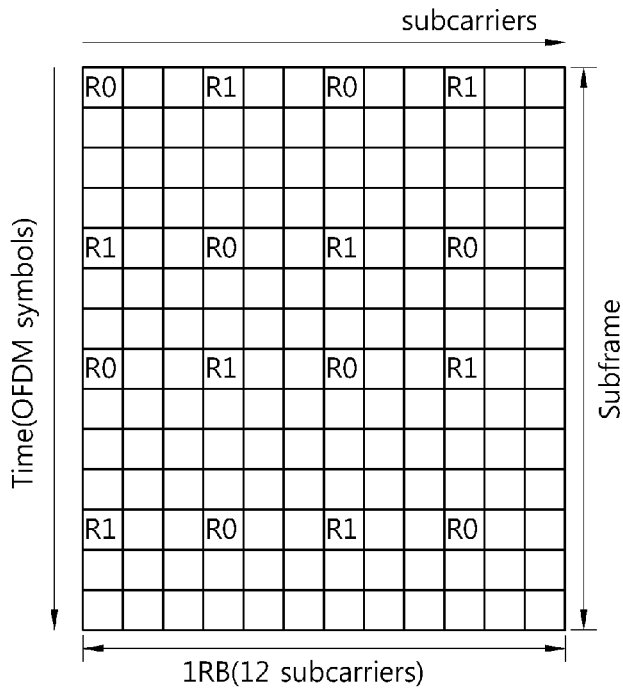
FIG. 11 shows an example of a reference signal structure when a base station uses two antennas.
Figure 12:
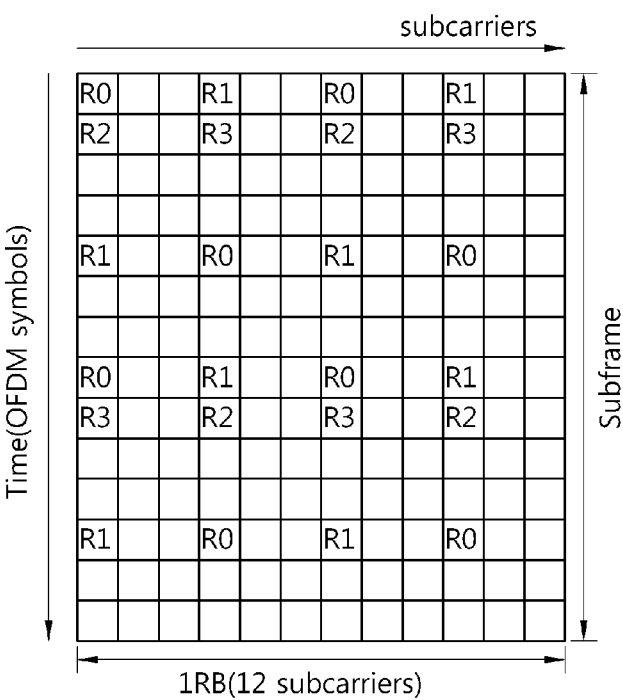
FIG. 12 shows an example of a reference signal structure when a base station uses four antennas.

In multi-antenna transmission, a BS uses a plurality of antennas, there is one resource grid defined per antenna. In FIG. 11 and FIG. 12 described below, reference symbols for all antennas are shown on the same resource grid for convenience of explanation. Rp denotes a resource element used to transmit a reference signal through an antenna p (where, p∈{0, 1, 2, 3}). Rp is not used for any transmission on any other antennas except for the antenna p. This is to avoid interference between antennas.

FIG. 11 shows an example of an RS structure when a BS uses two antennas.

Referring to FIG. 11, R0 and R1 do not overlap with each other. In one OFDM symbol, each Rp is located with a spacing of 6 subcarriers. In a subframe, the number of R0s is equal to the number of R1s. In addition, in one OFDM symbol, the number of R0s is identical to the number of R1s.

FIG. 12 shows an example of an RS structure when a BS uses four antennas.

Referring to FIG. 12, R0 to R3 do not overlap with one another. In one OFDM symbol, each Rp is located with a spacing of 6 subcarriers. In a subframe, the number of R0s is equal to the number of R1s, and the number of R2s is equal to the number of R3s. In the subframe, the number of R2s and R3s is less than the number of R0s and R1s.

R0 and R1 are paired with each other, and R2 and R3 are paired with each other. The paired R0 and R1 may be referred to as a first pair, and the paired R2 and R3 may be referred to as a second pair. The first pair and the second pair are included in different OFDM symbols. Therefore, a reference signal of an antenna 0 and a reference signal of an antenna 1 are paired with each other and are then transmitted in the same OFDM symbol. For example, in both of a 1st slot and a 2nd slot within a subframe, the reference signal of the antenna 0 and the reference signal of the antenna 1 are paired and transmitted in OFDM symbols whose OFDM symbol indices are 0 and 4 (l=0, 4). Further, reference signals of an antenna 2 and an antenna 3 are paired and transmitted on the same OFDM symbol. For example, in both of the 1st slot and the 2nd slot within the subframe, the reference signal of the antenna 2 and the reference signal of the antenna 3 are paired and transmitted in an OFDM symbol whose OFDM symbol index is 1 (l=1).

Figure 13:
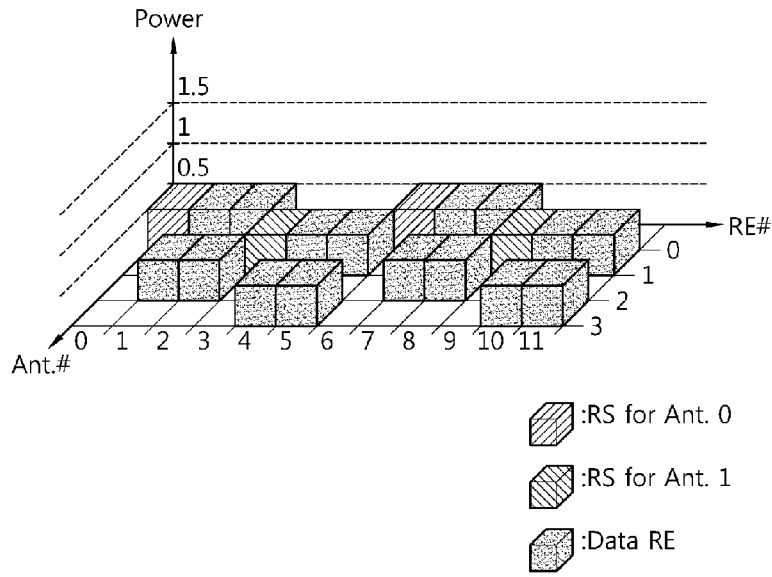
FIG. 13 is a graph showing an example of power allocation for each resource element in an OFDM symbol.

FIG. 13 is a graph showing an example of power allocation for each resource element in an OFDM symbol. The index of the OFDM symbol is 0 (l=0). The x axis represents an antenna index, the y axis represents a subcarrier index within a resource block, and the z axis represents power.

Referring to FIG. 13, antennas 0 and 1 each has two reference symbols and four data symbols. Antennas 2 and 3 each has four data symbols. If the index of the OFDM symbol is 4, the same graph can be applied by changing the antenna index.

Figure 14:
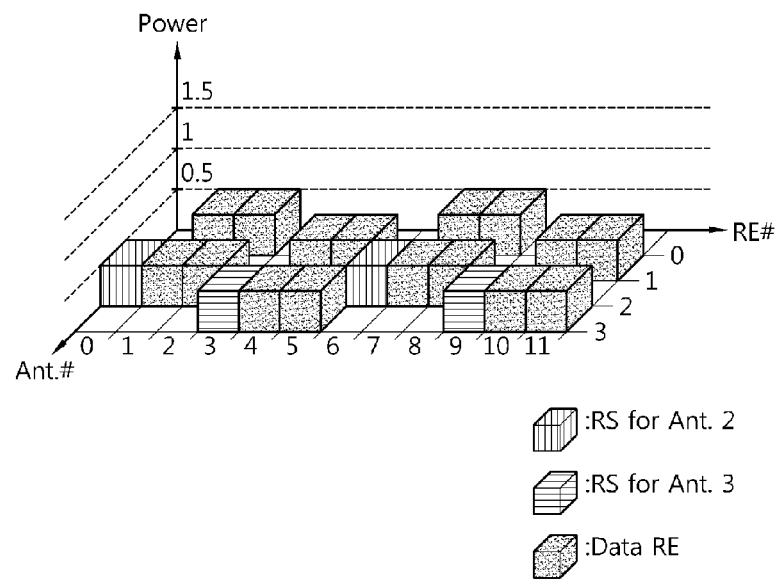
FIG. 14 is a graph showing another example of power allocation for each resource element in an OFDM symbol.

FIG. 14 is a graph showing another example of power allocation for each resource element in an OFDM symbol. The index of the OFDM symbol is 1 (l=1). The x axis represents an antenna index, the y axis represents a subcarrier index within a resource block, and the z axis represents power.

Referring to FIG. 14, antennas 0 and 1 each has four data symbols. Antennas 2 and 3 each has two reference symbols and four data symbols.

As such, In an OFDM symbol whose OFDM symbol index is 0 or 4 (l=0, 4), paired reference signals of the antennas 0 and 1 (a first pair) are transmitted, and a large amount of power is allocated to the antennas 0 and 1 each. In an OFDM symbol whose OFDM symbol index is 1 (l=1), paired reference signals of the antennas 2 and 3 (a second pair) are transmitted, and a large amount of power is allocated to the antennas 2 and 3 each.

That is, the first pair and the second pair are transmitted in different OFDM symbols. Therefore, when power boosting is performed on reference symbols, power is boosted only for antennas with specific pairing in one OFDM symbol. Further, it is difficult to achieve even power transmission for each antenna. Even power transmission allows each antenna of a multiple antenna system to have the same Tx power as much as possible. Even power transmission using multiple antennas can result in decrease in implementation cost and improvement in system performance. To enable even power transmission using the multiple antennas, it is preferable that each antenna has the same number of reference symbols in one OFDM symbol.

Within one subframe, the number of paired R0s and R1s is double of the number of paired R2s and R3s in a time domain. The antennas 2 and 3 each has a lower channel estimation performance than that of the antennas 0 and 1 each in a time selective channel. Whether a channel is the time selective channel can be known by based on a coherence time. The coherent time is inversely proportional to a Doppler spread. When using a multiple antenna scheme which is designed to achieve even power transmission for each antenna, system performance may significantly deteriorate if channel estimation performance is uneven for each antenna. Therefore, there is a need for a method for transmitting a reference signal to provide even power transmission for each antenna in the multiple antenna system.

When using the multiple antenna system, data can be recovered only when a reference signal for each antenna is identifiable. To avoid interference between reference signals for respective antennas, frequency division multiplexing (FDM), time division multiplexing (TDM), or code division multiplexing (CDM) can be used. In the FDM, a reference signal for each antenna is transmitted by being divided in a frequency domain. In the TDM, the reference signal for each antenna is transmitted by being divided in a time domain. In the CDM, the reference signal for each antenna is transmitted by using a different sequence. When the FDD and TDM are used to transmit reference signals through multiple antennas, reference symbols for each antenna do not overlap with one another. When the CDM is used, resource elements used for transmission of a reference signal for each antenna may overlap with one another. Therefore, when the CDM is used, the reference signals can be transmitted through the multiple antennas without significantly increasing a reference signal overhead.

Hereinafter, a method for transmitting a reference signal to achieve even power transmission for each antenna in a multiple antenna system by using CDM will be described.

Figure 15:
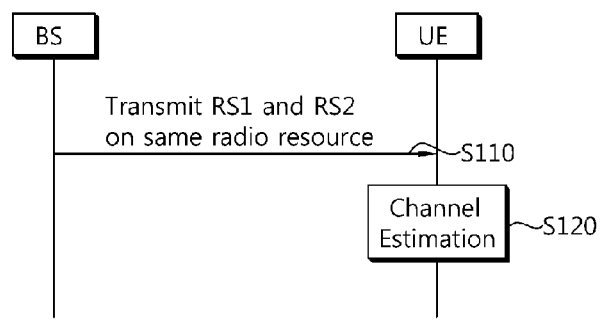
FIG. 15 is a flow diagram showing an example of a method for transmitting a reference signal in a multiple antenna system.

FIG. 15 is a flow diagram showing an example of a method for transmitting a reference signal in a multiple antenna system.

Referring to FIG. 15, a BS transmits a 1st reference signal (RS1) through a 1st antenna group and transmits a 2nd reference signal (RS2) through a 2nd antenna group (step S110). The RS1 and the RS 2 are transmitted through a same radio resource. The RS1 generates based on a 1st sequence, and the RS2 generates based on a 2nd sequence. A UE estimates a channel in accordance with the RS1 and the RS2 (step S120).

As such, by using the CDM, a resource element used as a reference symbol of one antenna can be multiplexed with a reference symbol of another antenna. The RS1 for one antenna may generate based on the 1st sequence, and the RS2 for another antenna may generate based on the 2nd sequence orthogonal to the 1st sequence. When the 1st sequence and the 2nd sequence are orthogonal to each other, the UE can recover the 1st sequence and the 2nd sequence without interference.

In addition, the 2nd sequence may use a sequence having a low correlation with the 1st sequence.

For example, when using four antennas, the CDM is applied by using the 2nd sequence so that reference signals of the antennas 2 and 3 are paired in an OFDM symbol in which reference signals of the antennas 0 and 1 using the 1st sequence are paired. In doing so, each OFDM symbol including reference symbols can simultaneously transmit reference signals of all antennas. Since the number of reference symbols of each of all antennas is identical in one OFDM symbol, even power transmission is possible.

If the 1st sequence and the 2nd sequence are orthogonal to each other, any sequence can be used as the 1st sequence and the 2nd sequence. In general, a reference signal sequence is a random sequence. Hereinafter, the 1st sequence is referred to as a pseudo-random (PN) sequence. For example, the 2nd sequence may be obtained by cyclic shifting or delaying the PN sequence in a time domain. When cyclic shifting is performed in the time domain, the 2nd sequence is configured in a form in which the PN sequence is multiplied by a phase shift sequence in a frequency domain. The phase shift sequence is hereinafter referred to as an orthogonal sequence (OS).

The 1st sequence may be the reference signal sequence of Equation 4. If ri(m) denotes the 2nd sequence obtained by cyclic shifting the reference signal sequence r(m), $r_i(m)$ can be expressed by the following equation.

MathFigure 6

$$r_i(m) = r(m) e^{-j\theta_i 1^m} \qquad [\text{Math.6}]$$

Herein, i=1, 2, ..., N (where N is a natural number). N 2nd sequences can be generated in accordance with i. N may differ in accordance with a channel condition. $\theta_i$ is a cyclic shift value, and can be expressed by the following equation for example.

MathFigure 7

$$\theta_i = \frac{2\pi(i-1)}{N} \qquad [\text{Math. 7}]$$

If $\theta_i$ is 0, the 2nd sequence is identical to the 1st sequence. That is, a reference signal sequence used for a reference signal is a two-layered sequence which is obtained by multiplying the PN sequence by the OS. Hereinafter, 'PN+OS' denotes a reference signal sequence obtained by multiplying the PN sequence by the OS. For example, 'PN0+OS0' and 'PN0+OS1' are obtained by applying different cyclic shifting to the same PN sequence, and are orthogonal to each other. That is, orthogonal reference signal sequences can be generated by multiplying the same PN sequence by different OSs. The PN sequence may change in accordance with an OFDM symbol position. The reference signal sequence may be obtained by cyclic shifting a changed PN sequence.

The cyclic shift value $\theta_i$ has a sufficient interval to identify an impulse response of a channel for each antenna. It is assumed that a wireless communication system operates in a channel environment where an effective OFDM symbol length is 66.7 μs, and a maximum delay spread is 5 μs. In this case, a cyclic shift value is provided at least every 5 μs. Therefore, 12 cyclic shifts can be identified. If reference symbols are located with a spacing of 6 subcarriers in one OFDM symbol, the number of available cyclic shifts is decreased by 6-fold. That is, the number of cyclic shift values may be 12/6=2.

For convenience of explanation, terminologies are defined as follows. Hereinafter, Px denotes a position of a resource element to which a reference signal is mapped. When a reference signal of one antenna is mapped to a resource element P1, the reference signal for the antenna is mapped to all resource elements P1. Rp denotes a reference symbol used for transmission of a reference signal of an antenna p. Rp corresponds to a reference signal sequence obtained by multiplying a PN sequence by an OS (i.e., PN+OS).

Figure 16:
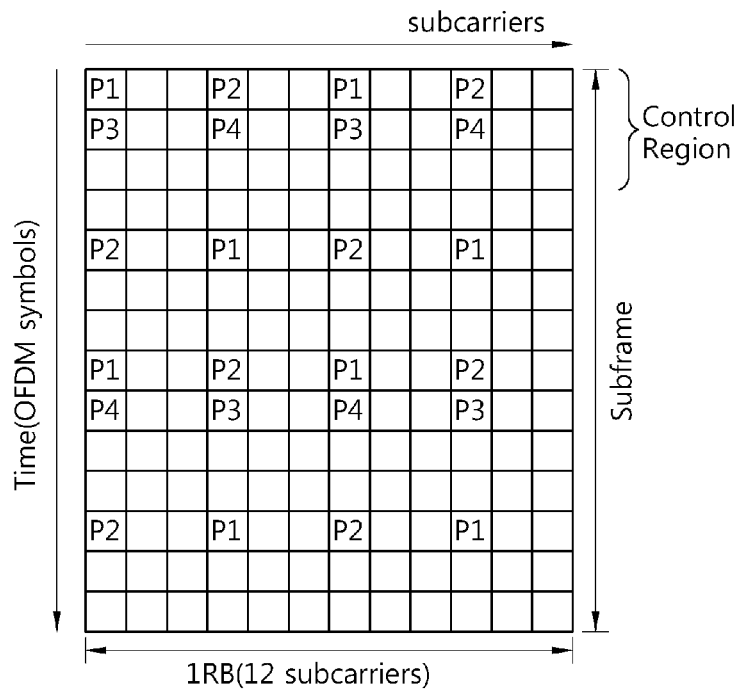
FIG. 16 shows an example of a reference signal structure.

FIG. 16 shows an example of an RS structure.

Referring to FIG. 16, P1 and P2 are paired in one OFDM symbol, and P3 and P4 are paired in another OFDM symbol. Px (x=0, 1, 2, 3), Rp (p=0, 1, 2, 3), and a reference signal sequence corresponding to Rp can be configured in various forms.

The following table shows a first example of a position of a resource element Px, a reference symbol Rp for each antenna, and a reference signal sequence.

TABLE 1

|    | R0        | R1        | R2        | R3        |
|----|-----------|-----------|-----------|-----------|
| P1 | PN0 + OS0 | —         | —         | —         |
| P2 | —         | PN0 + OS0 | —         | —         |
| P3 | —         | —         | PN0 + OS0 | —         |
| P4 | —         | —         | —         | PN0 + OS0 |

In P1, a reference signal of an antenna 0 is transmitted. In P2, a reference signal of an antenna 1 is transmitted. In P3, a reference signal of an antenna 2 is transmitted. In P4, a reference signal of an antenna 3 is transmitted. The CDM is not used herein. This is the same format as the RS structure of FIG. 12 in which four antennas are used.

The following table shows a second example of a position of a resource element Px, a reference symbol Rp for each antenna, and a reference signal sequence.

TABLE 2

|    | R0        | R1        | R2        | R3        |
|----|-----------|-----------|-----------|-----------|
| P1 | PN0 + OS0 | —         | PN0 + OS1 | —         |
| P2 | —         | PN1 + OS0 | —         | PN1 + OS1 |
| P3 | PN0 + OS0 | —         | PN0 + OS1 | —         |
| P4 | —         | PN1 + OS0 | —         | PN1 + OS1 |

Each antenna may use a different reference signal sequence. In an OFDM symbol in which P1 and P2 (or P3 and P4) are paired, different PN sequences may be used in P1 and P2 (or P3 and P4). In P1 and P3 each, R0 and R2 are multiplexed using orthogonal reference signal sequences. R0 and R2 use the same PN sequence, and use different OSs. In P2 and P4 each, R1 and R3 are multiplexed using orthogonal reference signal sequences. R1 and R3 use the same PN sequence, and use different OSs. Therefore, each antenna has the same number of reference symbols in the OFDM symbol in which P1 and P2 (or P3 and P4) are paired. The FDM and CDM are used herein. In this case, even power transmission for each antenna is possible.

The example of Table 2 may change variously as long as satisfying the requirement of even power transmission for each antenna. That is, the FDM and CDM are used for even power transmission, and irrespective of an antenna number, each antenna has the same number of reference symbols in the OFDM symbol in which P1 and P2 (or P3 and P4) are paired.

The following table shows a third example of a position of a resource element Px, a reference symbol Rp for each antenna, and a reference signal sequence.

TABLE 3

|    | R0        | R1        | R2        | R3        |
|----|-----------|-----------|-----------|-----------|
| P1 | —         | PN0 + OS0 | —         | PN0 + OS1 |
| P2 | PN0 + OS1 | —         | PN0 + OS0 | —         |
| P3 | —         | PN0 + OS0 | —         | PN0 + OS1 |
| P4 | PN0 + OS1 | —         | PN0 + OS0 | —         |

In an OFDM symbol in which P1 and P2 (or P3 and P4) are paired, the same PN sequence may be used in P1 and P2 (or P3 and P4). In P1 and P3 each, R1 and R3 are multiplexed using orthogonal reference signal sequences. R1 and R3 use the same PN sequence, and use different OSs. In P2 and P4 each, R0 and R2 are multiplexed using orthogonal reference signal sequences. R0 and R2 use the same PN sequence, and use different OSs. Therefore, each antenna has the same number of reference symbols in the OFDM symbol in which P1 and P2 (or P3 and P4) are paired.

For example, OS1 used by R3 in P1 may have a phase of $\pi/2$ corresponding to a cyclic shift. In this case, the cyclic shift can be determined by differently setting a start phase offset for each OFDM symbol.

Figure 17:
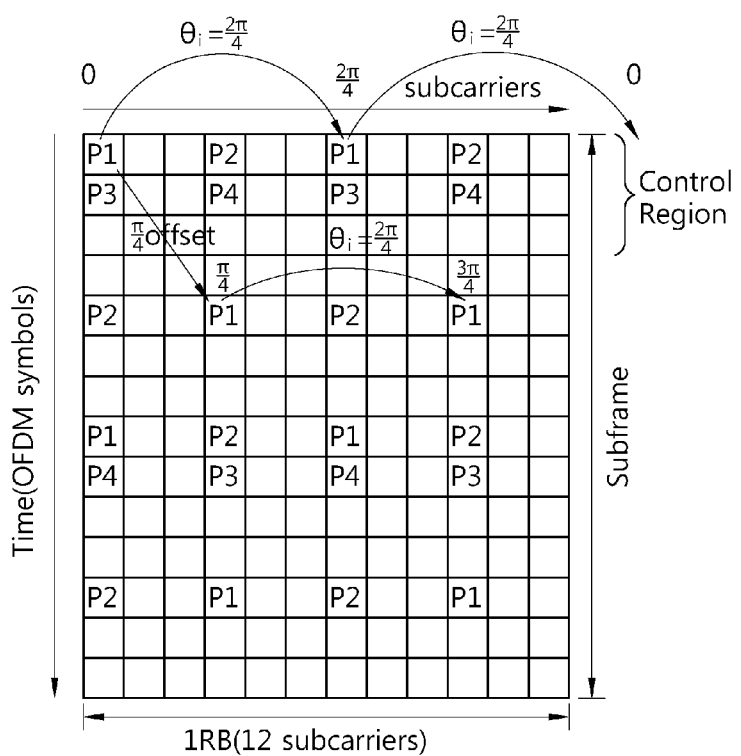
FIG. 17 shows an example of a cyclically shifted reference signal structure.

FIG. 17 shows an example of a cyclically shifted RS structure.

Referring to FIG. 17, a cyclic shift value $\theta_i$ within one OFDM symbol is $\pi/2$. If an OFDM symbol index is 0 (l=0), a start phase offset of P1 is 0. If the OFDM symbol index is 4 (l=4), the start phase offset of P1 is $\pi/4$.

The following table shows a fourth example of a position of a resource element Px, a reference symbol Rp for each antenna, and a reference signal sequence.

TABLE 4

|    | R0        | R1        | R2        | R3        |
|----|-----------|-----------|-----------|-----------|
| P1 | PN0 + OS0 | —         | PN0 + OS1 | —         |
| P2 | —         | PN1 + OS0 | —         | PN1 + OS1 |
| P3 | PN2 + OS0 | —         | PN2 + OS1 | —         |
| P4 | —         | PN3 + OS0 | —         | PN3 + OS1 |

In an OFDM symbol in which P1 and P2 (or P3 and P4) are paired, the same PN sequence may be used in P1 and P2 (or P3 and P4). In P1 and P3 each, R0 and R2 are multiplexed using orthogonal reference signal sequences. In P2 and P4 each, R1 and R3 are multiplexed using orthogonal reference signal sequences. Therefore, each antenna has the same number of reference symbols in the OFDM symbol in which P1 and P2 (or P3 and P4) are paired. Even if a reference signal is transmitted through one antenna, a different PN sequence may be used when a numeral x of Px differs due to a different OFDM symbol position. For example, for a reference signal for antenna 0, PN0 is used in P1 and PN2 is used in P3. In this case, a cell-based sequence can be randomized in a multi-cell environment.

When reference signals of multiple antennas are multiplexed using the CDM, power used before multiplexing can be evenly distributed to be used. However, if a receiver cannot support an RS structure using the CDM, power of the reference signal is halved and thus channel estimation performance may significantly decrease. Accordingly, it is need to control power of each antenna's reference signal multiplexed using the CDM. A 1st sequence multiplexed with a 2nd sequence on the same resource element may have a different power ratio. The 1st sequence is a PN sequence, and the 2nd sequence is obtained by cyclic shifting the 1st sequence in a time domain. For example, power of a specific antenna may be controlled so that a specific antenna has a robust channel estimation performance. In addition, reference signal power of an antenna using the 2nd sequence obtained by cyclic shifting the 1st sequence may be set to a relatively small value.

A signal received in P1 can be expressed by the following equation.

MathFigure 8

$$\tilde{r}_{P1}(m) = h_1 \sqrt{\alpha} \cdot r(m) e^{-j\theta_0} + h_2 \sqrt{1-\alpha} \cdot r(m) e^{-j\theta_1} 1^m \quad \text{[Math.8]}$$

Herein, m is 0, 1, ..., $2N^{max,DL} - 1$. $h_1$ and $h_2$ each denotes a channel, and a denotes a power control factor. If total Tx power is 1, $\alpha$ satisfies $0 \leq \alpha \leq 1$. For example, if $\alpha = 1$, it implies that a reference symbol for one antenna is mapped for each Px as shown in Table 1. If $\alpha = 0.5$, the 1st and 2nd sequences multiplexed using the CDM have the same power. By regulating $\alpha$, power of a reference signal sequence for each antenna can be regulated.

Although an RS structure when using 4 antennas has been described up to now for example, a method for transmitting a reference signal by using the CDM can also apply when four or more antennas are used.

In a method described below, a reference signal is transmitted using the CDM when 8 antennas are used. Hereinafter, for convenience of explanation, the 1st sequence is referred to as a pseudo-random sequence 1 (PN1), and the 2nd sequence is referred to as a pseudo-random sequence 2 (PN2). As described above, the PN2 may be obtained by cyclic shifting or delaying the PN1 in a time domain. When cyclic shifting is performed in the time domain, the PN2 is configured in a form in which the PN1 is multiplied by a phase shift sequence in a frequency domain. Rp denotes a reference symbol of an antenna p. A numeral p is any one value selected from 0, 1, 2, ..., 7.

In FIG. 18 to FIG. 21 described below, R0 and R4 are multiplexed on P1. R1 and R5 are multiplexed on P2. R2 and R6 are multiplexed on P3. R3 and R7 are multiplexed on P4. R0, R1, R2, and R3 each use the PN1 as the reference signal sequence. R4, R5, R6, and R7 each use the PN2 as the reference signal sequence. This can be expressed by the following table.

TABLE 5

|    | R0  | R1  | R2  | R3  | R4  | R5  | R6  | R7  |
|----|-----|-----|-----|-----|-----|-----|-----|-----|
| P1 | PN1 |     |     |     | PN2 |     |     |     |
| P2 |     | PN1 |     |     |     | PN2 |     |     |
| P3 |     |     | PN1 |     |     |     | PN2 |     |
| P4 |     |     |     | PN1 |     |     |     | PN2 |

As such, the PN1 and the PN2, which are orthogonal to each other, can be used to transmit reference signals of 8 antennas.

Figure 18:
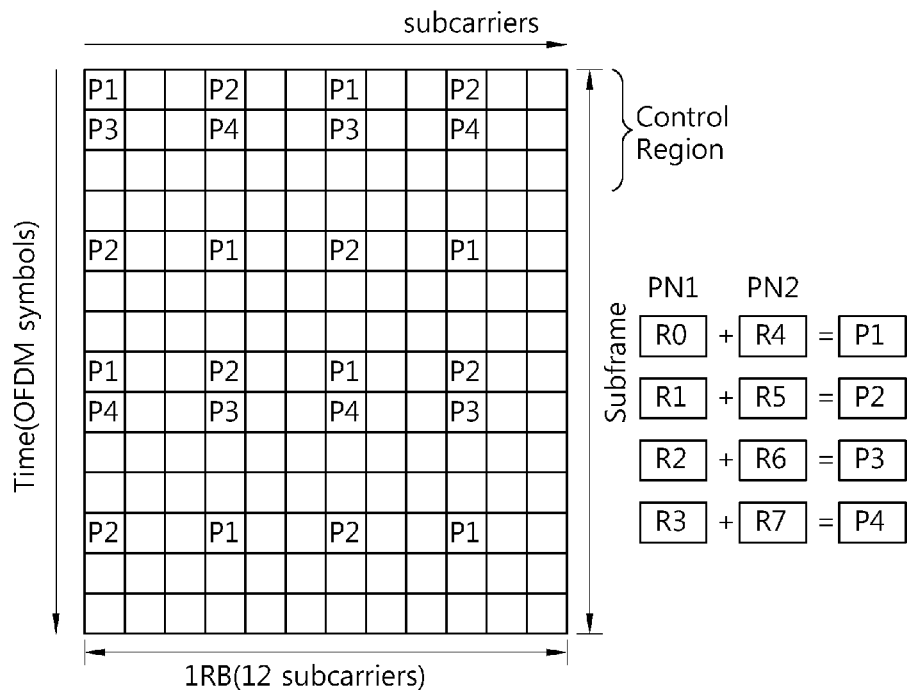
FIG. 18 shows a first example of a reference signal structure using code division multiplexing (CDM).

FIG. 18 shows a first example of an RS structure using CDM.

Referring to FIG. 18, an RS structure using 4 antennas (see FIG. 12) is extended to an RS structure using 8 antennas. Channel estimation performances of antennas 4 to 7 are respectively identical to those of antennas 0 to 3. A reference symbol overhead is 14% similarly to the RS structure using 4 antennas (see FIG. 12). In an OFDM symbol including reference symbols, the number of data symbols is properly maintained. Thus, power boosting of the reference symbols can be easily performed. In particular, a data symbol structure in a control region is not changed. Therefore, the structure of FIG. 18 can be compatible with the 3GPP LTE system.

However, the number of reference symbols used in antennas 0, 1, 4, and 5 is double of that used in antennas 2, 3, 6, and 7, respectively. Therefore, each of the antennas 2, 3, 6, and 7 has poorer channel estimation performance than each of the antennas 0, 1, 4, and 5. In particular, each of the antennas 2, 3, 6, and 7 may have inferior channel estimation performance in a time selective channel.

Figure 19:
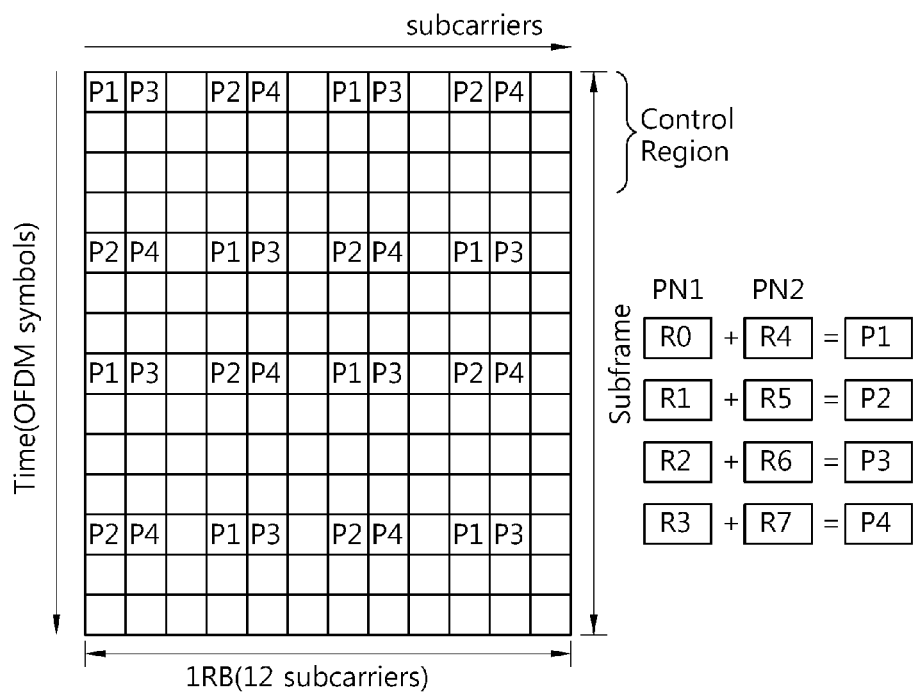
FIG. 19 shows a second example of a reference signal structure using CDM.

FIG. 19 shows a second example of an RS structure using CDM.

Referring to FIG. 19, antennas 0 to 7 each has the same number of reference symbols. Thus, each of the antennas 0 to 7 has the same channel estimation performance. A reference symbol overhead is 19%. In addition, reference symbols of all antennas are transmitted in one OFDM symbol. Therefore, even power transmission is possible among the antennas 0 to 7.

However, the number of data symbols is small in an OFDM symbol including reference symbols. Therefore, power boosting of reference symbols is limited. In particular, when the power boosting of the reference symbols is limited in a control region, reliability of a control channel may deteriorate.

FIG. 20 shows a third example of an RS structure using CDM.

Referring to FIG. 20, the CDM is not used in a region used as a control region, and only reference symbols for 4 antennas are transmitted on the region. On the remaining regions other than the control region, reference symbols for 8 antennas may be transmitted using the CDM. The control region and an RS structure in the control region can be maintained identical to those in the 3GPP LTE system, thereby maintaining compatibility with the 3GPP LTE system.

FIG. 21 shows a fourth example of an RS structure using CDM. In this RS structure, a reference symbol overhead is decreased to 14% while maintaining a characteristic of the RS structure of FIG. 19.

Referring to FIG. 21, antennas 0 to 7 each has the same number of reference symbols. Thus, the antennas 0 to 7 each has the same channel estimation performance. The reference symbol overhead is 14%. In addition, in one OFDM symbol, reference symbols of all antennas are transmitted. Therefore, even power transmission is possible among the antennas 0 to 7. Further, the number of data symbols is properly maintained for an OFDM symbol including reference symbols. Therefore, power boosting of the reference signals can be easily performed.

Figure 22:
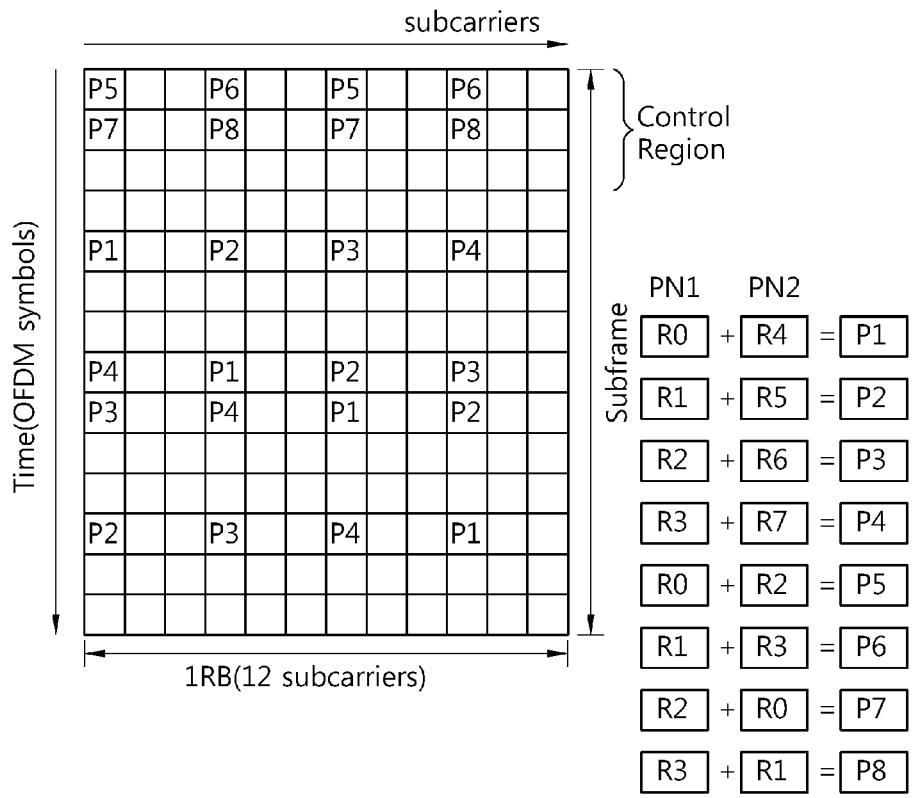
FIG. 22 shows a fifth example of a reference signal structure using CDM.

FIG. 22 shows a fifth example of an RS structure using CDM.

Referring to FIG. 22, R0 and R4 are multiplexed on P1. R1 and R5 are multiplexed on P2. R2 and R6 are multiplexed on P3. R3 and R7 are multiplexed on P4. In this case, R0, R1, R2, and R3 each use PN1 as a reference signal sequence, and R4, R5, R6, and R7 each use PN2 as the reference signal sequence. R0 using PN1 and R2 using PN2 are multiplexed on P5. R1 using PN1 and R3 using PN2 are multiplexed on P6. R2 using PN1 and R0 using PN2 are multiplexed on P7. R3 using PN1 and R1 using PN2 are multiplexed on P8. This can be expressed by the following table.

TABLE 6

|    | R0  | R1  | R2  | R3  | R4  | R5  | R6  | R7  |
|----|-----|-----|-----|-----|-----|-----|-----|-----|
| P1 | PN1 |     |     |     | PN2 |     |     |     |
| P2 |     | PN1 |     |     |     | PN2 |     |     |
| P3 |     |     | PN1 |     |     |     | PN2 |     |
| P4 |     |     |     | PN1 |     |     |     | PN2 |

TABLE 6-continued

| | R0 | R1 | R2 | R3 | R4 | R5 | R6 | R7 |
|---|---|---|---|---|---|---|---|---|
| P5 | PN1 | | PN2 | | | | | |
| P6 | | PN1 | | PN2 | | | | |
| P7 | PN2 | | PN1 | | | | | |
| P8 | | PN2 | | PN1 | | | | |

As shown in the above table, instead of using the same sequence for all reference symbols of the same antenna, different sequences can be used according to a position of an OFDM symbol.

Figure 23:
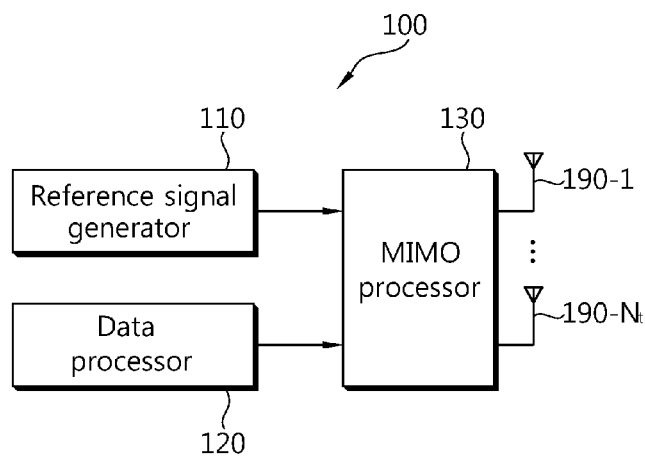
FIG. 23 is a block diagram showing an example of a transmitter using multiple antennas.

FIG. 23 is a block diagram showing an example of a transmitter using multiple antennas. The transmitter may be a part of a BS or a part of a UE.

Referring to FIG. 23, a transmitter 100 includes a reference signal generator 110, a data processor 120, and a MIMO processor 130.

The reference signal generator 110 generates a reference signal as described up to now. The data processor 120 generates a data symbol by performing data processing. For example, data processing includes channel coding, modulation, etc. The MIMO processor 130 processes a data symbol and a reference signal according to a MIMO scheme depending on Tx antennas 190-1, ..., 190-Nt. The data symbol and the reference signal are mapped to resource elements for each of the Tx antennas 190-1, ..., 190-Nt, and then an OFDM symbol is generated. The generated OFDM signal is transmitted on each of the Tx antennas 190-1, ..., 190-Nt.

Figure 24:
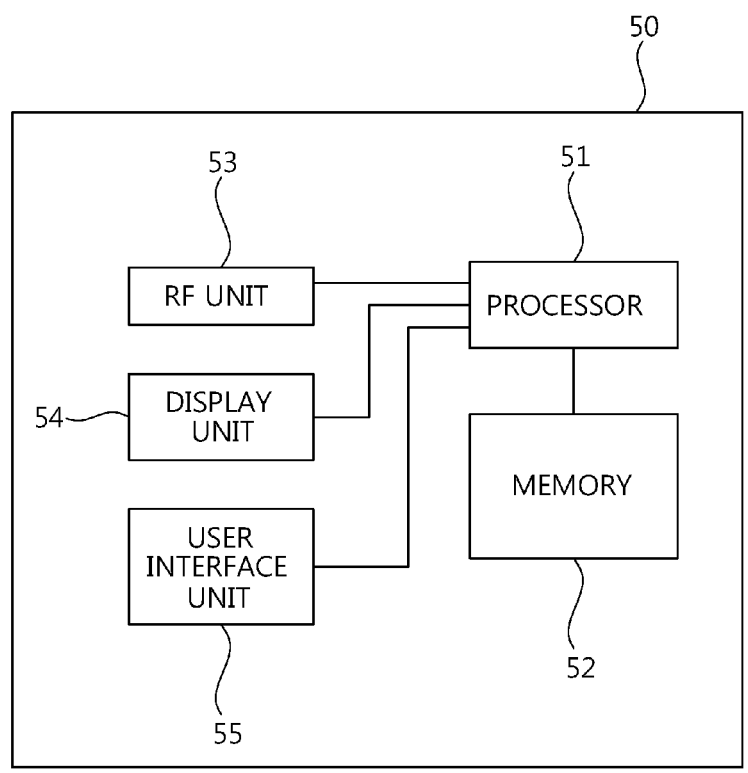
FIG. 24 is a block diagram showing an apparatus for a wireless communication.

FIG. 24 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement proposed functions, procedures and/or methods described in this description. Layers of the radio interface protocol may be implemented in the processor 51. The processor 51 may provide the control plane and the user plane. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit and/or data processing device. The memories 52 may include read-only memory (ROM), random access memory (RAM), flash memory, memory card, storage medium and/or other storage device. The RF units 53 may include baseband circuitry to process radio frequency signals. When the embodiments are implemented in software, the techniques described herein can be implemented with modules (e.g., procedures, functions, and so on) that perform the functions described herein. The modules can be stored in memories 52 and executed by processor 51. The memories 52 can be implemented within the processor 51 or external to the processor 51 in which case those can be communicatively coupled to the processor 51 via various means as is known in the art.

Although the reference signal structure has been described up to now for downlink communication, it can also apply for uplink communication.

As described above, a method and an apparatus for effectively transmitting a reference signal in a multiple antenna system can be provided. By the use of a reference signal structure using CDM, different antennas can transmit respective reference signals by using the same resource element. That is, the number of reference symbols for each antenna can be increased without increasing a reference signal overhead. Therefore, the reference signal structure can be designed so that even power transmission for each antenna is possible. In doing so, implementation cost can be decreased and system performance can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting a signal by using a radio resource in a multiple antenna system, the method comprising:

transmitting a first reference signal for a first antenna using a first sequence; and transmitting a second reference signal for a second antenna using a second sequence, wherein the radio resource comprises first type resource elements (REs) and second type REs, each of the first type REs transmitting the first and second reference signals and the second type REs not transmitting the first and the second reference signals, wherein the first sequence comprises a first portion and a second portion, the first portion is multiplied by a first phase shift value, the second portion is multiplied by a second phase shift value, and a phase offset exists between the first and second phase shift values, and wherein the first portion of the first reference signal and the second portion of the first reference signal are transmitted through a same time duration, and REs transmitting the first reference signal are same as REs transmitting the second reference signal.

2. The method of claim 1, wherein the first reference signal and the second reference signal are transmitted through at least one orthogonal frequency division multiplexing (OFDM) symbol.

3. The method of claim 1, wherein the phase offset is determined based on an RE in which the first portion of the first reference signal is allocated.

4. The method of claim 1, wherein the second sequence is orthogonal to the first sequence.

5. The method of claim 1, wherein the first sequence has a low correlation with the second sequence.

6. The method of claim 1, wherein the first reference signal and the second reference signal are used for recovering data.

7. The method of claim 1, wherein the method is performed by a base station.

8. A method for receiving a signal by using a radio resource from a transmitter at a user equipment, the method comprising:
   receiving a first reference signal which is transmitted by a first antenna of the transmitter using a first sequence; and
   receiving a second reference signal which is transmitted by a second antenna of the transmitter using a second sequence,
   wherein the radio resource comprises first type resource elements (REs) and second type REs, each of the first type REs transmitting the first and second reference signals and the second type REs not transmitting the first and the second reference signals,
   wherein the first sequence comprises a first portion and a second portion, the first portion is multiplied by a first phase shift value, the second portion is multiplied by a second phase shift value, and a phase offset exists between the first and second phase shift values,
   wherein the first portion of the first reference signal and the second portion of the first reference signal are transmitted through a same time duration, and REs transmitting the first reference signal are same as REs transmitting the second reference signal.

9. A user equipment receiving a signal by using a radio resource from a transmitter, the user equipment comprising:
   a transceiver configured for:
      receiving a first reference signal which is transmitted by a first antenna of the transmitter using a first sequence; and
      receiving a second reference signal which is transmitted by a second antenna of the transmitter using a second sequence,
   wherein the radio resource comprises first type resource elements (REs) and second type REs, each of the first type REs transmitting the first and second reference signals and the second type REs not transmitting the first and the second reference signals,
   wherein the first sequence comprises a first portion and a second portion, the first portion is multiplied by a first phase shift value, the second portion is multiplied by a second phase shift value, and a phase offset exists between the first and second phase shift values, and
   wherein the first portion of the first reference signal and the second portion of the first reference signal are transmitted through a same time duration, and REs transmitting the first reference signal are same as REs transmitting the second reference signal.

* * * * *